United States Patent [19]

Brown et al.

[11] Patent Number: 5,838,786
[45] Date of Patent: Nov. 17, 1998

[54] INTELLIGENT ACOUSTIC SYSTEMS PERIPHERAL

[75] Inventors: David A. Brown, Indianapolis; Alan Dean Michel, Fishers; Wayne Allen Weise, Noblesville, all of Ind.; James Edward West, Plainfield, N.J.

[73] Assignee: Lucent Technologies, Inc., Murray Hill, N.J.

[21] Appl. No.: 726,436

[22] Filed: Oct. 4, 1996

[51] Int. Cl.[6] .............................. H04M 1/00; H04M 3/00
[52] U.S. Cl. .......................... 379/407; 379/410; 379/267
[58] Field of Search .................................. 379/377, 420, 379/422, 430, 387, 388, 93.07, 93.29, 93.32, 93.37, 101.01, 410, 406, 411, 407, 267; 395/200, 34, 200.35

[56] References Cited

U.S. PATENT DOCUMENTS

| | | | |
|---|---|---|---|
| 4,792,940 | 12/1988 | Hiraguch ................................. | 370/292 |
| 4,879,738 | 11/1989 | Petro ......................................... | 379/3 |
| 5,121,426 | 6/1992 | Baumhauer, Jr. et al. ............. | 379/388 |
| 5,226,076 | 7/1993 | Baumhauer, Jr. et al. ............. | 379/388 |
| 5,263,020 | 11/1993 | Yatsuzuka et al. ..................... | 370/289 |
| 5,400,399 | 3/1995 | Umemoto ................................. | 379/388 |
| 5,402,499 | 3/1995 | Robison et al. ......................... | 381/119 |
| 5,471,470 | 11/1995 | Sharma et al. .......................... | 370/271 |
| 5,524,110 | 6/1996 | Danneels, et al. ........................ | 370/62 |
| 5,548,642 | 8/1996 | Diethorn ................................. | 379/410 |
| 5,617,423 | 4/1997 | Li et al. ................................... | 370/426 |
| 5,650,831 | 7/1997 | Farwell ................................... | 348/734 |
| 5,673,257 | 9/1997 | Sharma et al. .......................... | 370/286 |

OTHER PUBLICATIONS

U.S. Patent Application of J. Yu 1, filed on July 26, 1996, serial number 08/690431.

"The Audio Dictionary" by Glenn D. White, University of Washington Press, Seattle and London, copywritten 1987, p. 108.

*Primary Examiner*—Daniel S. Hunter
*Assistant Examiner*—Charles N. Appiah
*Attorney, Agent, or Firm*—Joseph J. Opalach

[57] ABSTRACT

In an embodiment of the invention, a speaker/microphone peripheral includes a digital-signal-processor (DSP) based acoustic echo canceler and supports a plurality of modes of operation. One mode is a video/telecommunications mode. In this mode, when headphones are inserted or removed, the acoustic echo canceler is reset.

11 Claims, 6 Drawing Sheets

FIG. 3
(SEE FIG. 4 FOR MORE DETAIL)

INTELLIGENT ACOUSTIC SYSTEMS PERIPHERAL

CROSS-REFERENCE TO RELATED APPLICATIONS

Related subject matter is disclosed in the co-pending, commonly assigned, U.S. Patent applications of Yu, entitled "Video and Audio Answering Machine," Ser. No. 08/690431, filed on Jul. 26, 1996; Brown et al., entitled "Intelligent Acoustic Systems Peripheral," Ser. No. XXX, filed on Oct. 4, 1996; and Michel et al., entitled "Intelligent Acoustic Systems Peripheral," serial No. XXX, filed on Oct. 4, 1996.

BACKGROUND OF THE INVENTION

The present invention relates to acoustical systems for use in personal computers workstations, or telephony systems.

In today's world, the availability, and access to, "multi-media" type communications is on the rise. For example, the ability to see and hear someone while communicating over telephone lines is no longer limited to specially designed video telephones. Such technology is now available by the use of a personal computer (PC), or workstation, specifically configured with a camera, a video capture board, and a speaker/microphone. For example, see U.S. Pat. No. 5,524,110 issued Jun. 4, 1996, and entitled "Conferencing over Multiple Transports," and the commercially available "ProShare" system from the Intel Corporation. These systems enable the calling and called parties to both see and hear each other. In fact, the above-mentioned U.S. Patent describes other types of PC-based services such as a video answering machine.

In such PC-based video telephony, or video conferencing, systems, a dedicated separate speaker and microphone system is used to enable hands-free full-duplex voice communications between the calling party and the called party during the video call.

Unfortunately, if a user of a PC incorporating video telephony hardware also wants to subsequently listen to stereo music played from a CD-ROM peripheral of the PC an extra set of speakers is required. In other words, if a user wants to have both PC-based video communications and listen to computer-based multi-media applications - separate speaker arrangements are necessary.

SUMMARY OF THE INVENTION

A speaker/microphone arrangement supports both a telecommunications mode and a multi-media mode of operation. In the telecommunications mode, an echo canceler is reset as a function of the presence of headphones.

In an embodiment of the invention, a speaker/microphone peripheral includes a digital-signal-processor (DSP) based acoustic echo canceler and supports a plurality of modes of operation. One mode is a video/telecommunications mode. In this mode, when headphones are inserted or removed, the acoustic echo canceler is reset.

DETAILED DESCRIPTION

As used herein, the term "telecommunications" means hardware and/or software involved in the communications (video and/or audio) between at least a calling party and a called party. In comparison, the term "computer-based multi-media applications" means all other hardware and/or software that cause acoustical signals to be generated by a speaker system or received by a microphone. For example, the above-mentioned playing of a song from a CD-ROM peripheral of a computer is considered to be a computer-based multi-media application notwithstanding the fact that, essentially, this particular application only plays audio from the CD-ROM.

Also, it should be noted that since the inventive concept is concerned with an acoustical system that operates in a plurality of different modes, such as a telecommunications mode, or a multi-media mode, specifics as to telecommunications hardware/software or particular multi-media applications are not described herein since such descriptions are not necessary to understanding the inventive concept.

Figure 1:
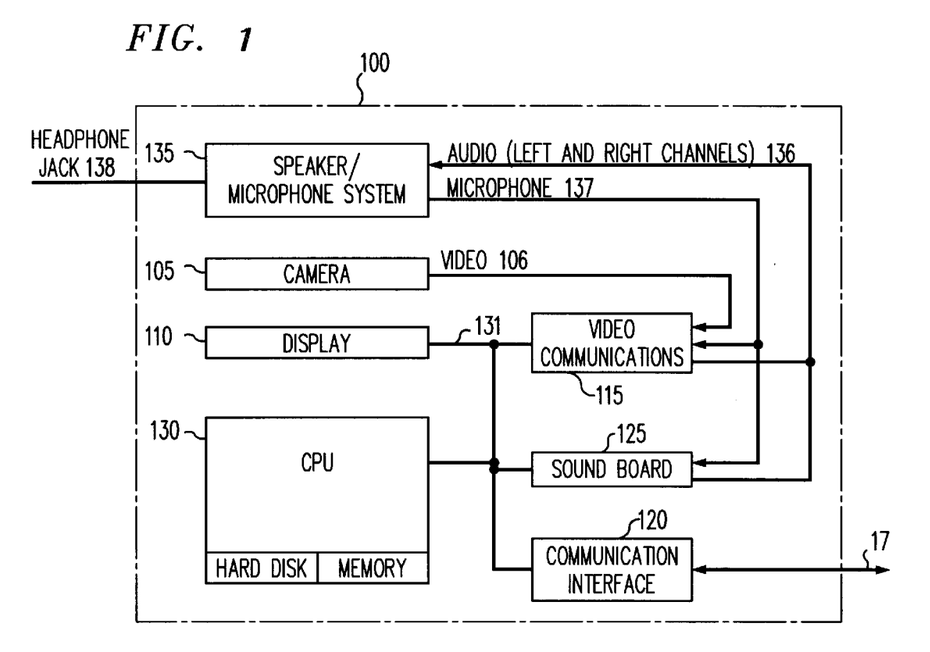
FIG. 1 shows an illustrative system-level block diagram of a speaker/microphone peripheral in accordance with the principles of the invention.

An illustrative system-level block diagram of a speaker/microphone peripheral in accordance with the principles of the invention is shown in FIG. 1. PC 100 comprises CPU 130 and display 110, both of which represent the core-element of a PC as known in the art. For example, CPU 130 is a pentium-based processor and includes: volatile and non-volatile memory such as read-only memory (ROM) and random access memory (RAM), non-removable magnetic media such as hard disk space as known in the art, and the ability to accommodate removable media such as floppy disks, CD-ROMs, etc. In addition CPU 130 includes a keyboard (not shown) and other pointing devices like a mouse. Display 110 represents a monitor for displaying information as known in the art and the video system for controlling the monitor. It is assumed that CPU 130 is running a disk-based operating system such as Windows 95 available from Microsoft Corporation. Finally, sound board 125 is, e.g., a soundblaster compatible sound board for providing audio signals (or line-in signaling) 136 to speaker system 135 and for receiving microphone signal 137 (or line-out signaling). Although not shown separately in FIG. 1, speaker/microphone system 135 includes a pair of speakers and a directional microphone included within one of the speakers enclosures.

The remaining elements of PC 100 for the purposes of this example are assumed to be a part of the video processing system coupled to CPU 130 via bus 131. The video processing system includes camera 105, video communications board 115, and communications interface 120. Camera 105 and video communications board 115 are illustratively part of the "Desk Top Video Phone product" from the Intel corporation and also known as "ProShare." Communications interface 120 is representative of any one of a number of communications interfaces such as an analog modem, ISDN, or local area network (LAN) interface. Communications interface 120 transmits to, and receives from, a far-end a digital signal incorporating picture and audio information via communications channels 17. The far-end could be located on a switched network (such as the public-switched-telephone-network (PSTN)), LAN, etc. (not shown).

Figure 2:
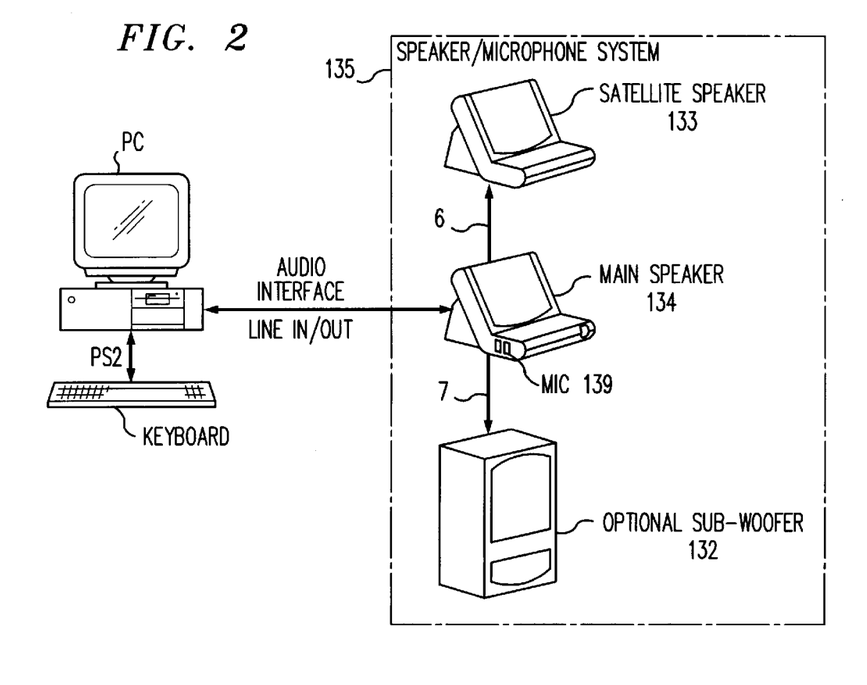
FIG. 2 shows an illustrative pictorial diagram of a speaker/microphone peripheral in accordance with the principles of the invention.

Turning now to FIG. 2, the latter shows a pictorial representation of the illustrative embodiment described herein. Speaker/microphone system 135 includes main speaker 134, satellite speaker 133, and an optional sub-woofer 132. Microphone 139 is mounted within main speaker 134. Microphone 139 is preferably a directional microphone such as the DM 1000 available from Lucent Technologies. The directional microphone is physically configured to reduce acoustic coupling from the speakers. (Additionally, directional microphone technology is described in U.S. Pat. No. 5,226,076, issued Jul. 6, 1993, to Baumhauer et al., entitled "Directional Microphone Assembly;" and U.S. Pat. No. 5,121,426, issued Jun. 9, 1992, to Baumhauer et al., entitled "Loudspeaking Telephone Station Including Direction al Microphone.")

Figure 3:
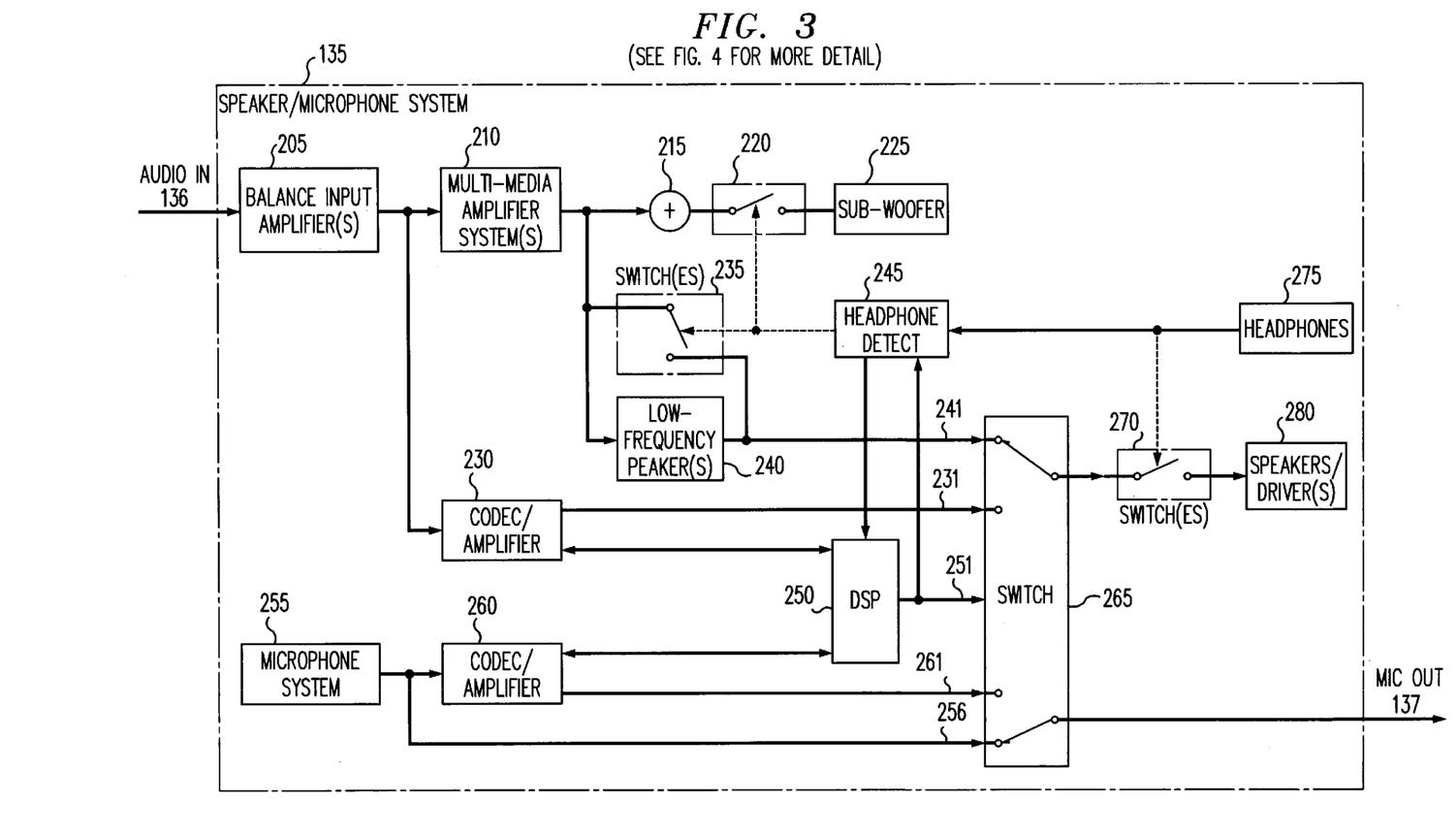
FIG. 3 shows an illustrative block diagram of a speaker/microphone peripheral in accordance with the principles of the invention.
Figure 4:
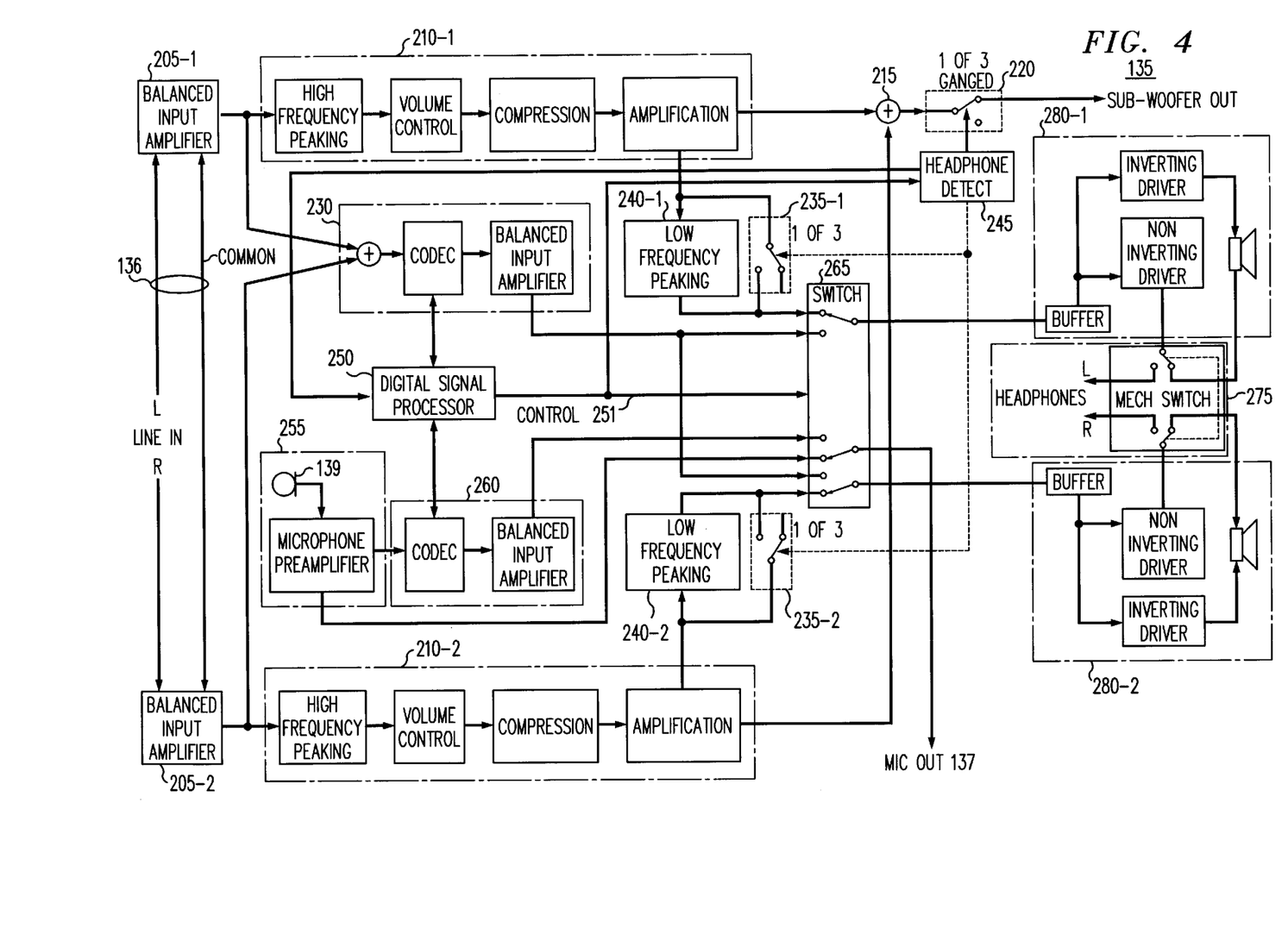
FIG. 4 shows a more detailed illustrative circuit-level block diagram of a speaker/microphone peripheral in accordance with the principles of the invention.

An illustrative block diagram of speaker/microphone system 135 is shown in FIG. 3. It should be noted that to highlight the inventive concept, FIG. 3 represents a simplified block diagram, which will be described below. A more detailed circuit-level block diagram of the components of speaker/microphone 135 is shown in FIG. 4. Other than the inventive concept, the components shown in FIGS. 3 and 4 are well-known and will not be described in detail. In accordance with the principles of the invention, speaker/microphone system 135 functions in different modes of operation. The latter are determined by DSP 250, which at least partially serves as a controller of speaker/microphone system 135. Although numerous different types of modes could be defined for speaker/microphone system 135, for the purposes of this description it is assumed that the following illustrative modes exist:

TABLE One

| Mode of Operation |
| --- |
| multi-media |
| narrow-band telecommurncations |
| wide-band telecommunications |

Transition between the above-defined modes of operation is described further below. (In this context, the mode of operation represents a "state" of speaker/microphone system 135. This state could be represented, e.g., by a value of a predetermined variable, or register, within DSP 250). Each of these modes will now be briefly described.

The "multi-media" mode of operation provides a wide-band stereo capability. This mode of operation enables speaker/microphone system 135 to support "computer-based multi-media applications" like the above-mentioned CD-ROM player. In this mode of operation, echo cancellation is disabled.

The narrow-band telecommunications mode, as the name implies, is useful for communications between a calling party and a called party. In this mode, the audio bandwidth is standard telephony: 3.2 kHz (kilo-hertz) and echo cancellation is enabled. The speakers provide a mono, or monophonic, operation.

The wide-band telecommunications mode is similar to the narrow-band telecommunications mode except that the audio bandwidth is extended to 7 kHz. In this mode of operation, echo cancellation is enabled. The speakers provide a mono, or monophonic, operation.

Upon power up, DSP 250 examines the state of two jumper pins (not shown) to determine the default mode of operation. (Obviously, these two jumper pins provide for a maximum of four default modes of operation. However, only three are available in accordance with Table One.) It is assumed that the multi-media mode of operation is the default mode.

As can be observed from the above, the modes of operation can be characterized as either "multi-media" or "telecommunications," with the essential difference being the enabling of an echo canceler in telecommunications mode. As such, the initial description of the elements of FIG. 3 will be in the context of either a multi-media mode or a telecommunications mode of operation.

Switch 265 of FIG. 3 is under the control of DSP 250 via control signal 251. The latter causes switch 265 to provide different signaling as a function of either a multi-media mode or a telecommunications mode. (Alternatively, switch 265 is known as a "selector" as known in the art). In the context of this description, control signal 251 is assumed to represent a binary digit ("bit"), where one value of the binary digit is associated with a multimedia mode of operation and the other value of the binary digit is associated with a telecommunications mode of operation. (Additional modes could be easily accommodated by simply enlarging this control bus to include more bits. However, as observed from Table One above, the number of operating modes is not restricted by the number of control bits on this control bus.)

In a multi-media mode of operation, switch 265 a) couples output signaling 241 to switch 270, and b) generates microphone signal 137 from the output signaling of microphone system 255. In contrast, in a telecommunications mode of operation, switch 265 a) couples codec/amplifier output signal 231 to switch 270, and b) generates microphone signal 137 from codec/amplifier output signal 261.

In light of the above operational modes, a brief overview of the operation of speaker/microphone 135 is now provided. Audio signals 136 are applied to balance input amplifier(s) 205, which provides output signals to a multi-media processing portion and a telecommunications processing portion. The multi-media processing portion comprises multi-media amplifier system(s) 210, summer 215, sub-woofer 225, low-frequency peaker(s) 240, and switches 220 and 235. In contrast, the telecommunications processing portion comprises codec/amplifier 230 and a portion of DSP 250 (described below). As described above, depending on the operational mode, either output signaling from the telecommunications processing portion or the multi-media processing portion will be selected by switch 265 for application to switch 270. (Again, to avoid confusion, it should be recalled that FIG. 3 is a simplified block diagram of FIG. 4. For example, balance input amplifier(s) 205 is representative of two balance input amplifiers for the left and right channel as shown in FIG. 4). It should be noted, that control signal 251 is also shown as applied to headphone detect circuitry 245. In effect, the control signal is logically "ORed" with signaling from headphone detect circuitry 245 to additionally disconnect sub-woofer 225 during the telecommunications mode.

In either a multi-media mode or a telecommunications mode, the signaling applied to switch 270 generates acoustical signals in one of two fashions depending on the presence of headphones 275. When headphones 275 are not present, the acoustical signals are generated by speakers/ drivers 280 and (if present and enabled) sub-woofer 225. In contrast, when headphones 275 are present, switch 270 switches the audio output from speakers/drivers 280 to headphones 275. Additionally, headphone detect circuitry 245 disconnects sub-woofer 225 from the audio system, via switch 220, and causes the output signaling from multi-media amplifier system 210 to bypass low-frequency peaking element 240, via switch 235. (It should be noted that switch 270 is representative of the traditional mechanical switching element used today to switch between headphone outputs and speaker outputs. For example, the physical plugging in of a headphone jack switches the state of switch 270. In contrast, headphone detect circuitry 245 is an additional detection element that electrically detects the presence of headphones 275.)

As can observed from FIG. 3, headphone detect circuitry 245 provides a signal to DSP 250. This signal alerts DSP 250 when headphones are inserted or removed so that in a telecommunications mode, e.g., narrow-band or wide-band, the echo canceler coefficients are reset, or retrained, due to a different acoustic transfer function.

Turning now to the microphone-side of speaker/microphone 135, similar generalizations can be made regarding a multi-media portion and a telecommunications portion. Microphone system 255 applies signaling to codec/amplifier 260. The latter element, along with a portion of DSP 250 (described below), represents the telecommunications portion. In terms of the multi-media portion, microphone system 255 simply directly applies an output signal to switch 265. The latter, as noted above, selects either the codec/amplifier output signal 261, or the microphone system 256 output signal, as the source of microphone signal 137 in accordance with the respective mode of operation.

Turning briefly to FIG. 4, the latter shows a more detailed block diagram of the components of speaker/microphone 135. Like numbers in FIG. 4 refer back to the numbers used in FIG. 3. Numbers of the type "210-1" and "210-2" reflect the fact that in actuality the left and right channels are separately processed as shown. Although not shown for simplicity, power for the unit is provided a wall-mounted transformer.

In order to support a telecommunications mode of operation, DSP 250 in conjunction with codec amplifiers 230 and 260 comprise a sub-band echo canceler for reducing loudspeaker to microphone coupling. The audio bandwidth is standard telephony: 3.2 kHz (kilo-hertz). Sub-band acoustic echo canceler technology is well-known as represented by U.S. Pat. No. 5,548,642, issued Aug. 20, 1996 and entitled "Optimization of adaptive filter tap settings for sub-band acoustic echo cancelers in teleconferencing." Although a full-band echo canceler is an alternative approach, a sub-band echo canceler converges faster in the presence of speech.) In the wide-band telecommunications mode, the audio bandwidth is increased to 7 kHz.

As a result of the above, a multi-media mode of operation provides audio stereo capability via speakers/drivers 280 for any computer-based multi-media applications. Conversely, a telecommunications mode of operation provides a monaural dual speaker and microphone with DSP-based acoustic echo canceler.

A noted above, a default mode of operation is provided by a set of jumpers (not shown). However, during operation, a simple method is proposed to allow any application, or the user, to switch between the various modes of operation. In particular, DSP 250 monitors the received audio signal (via codec/amplifier 230) for a specific DTMF (dual-tone-multi-frequency) sequence, which controls the mode and operation of speaker/microphone 135. In other words, in-band signaling is used to switch modes since the audio, or acoustical, signals themselves convey the control signaling. (Generally speaking, in-band signaling can be defined as using a portion of the bandwidth of an information-bearing signal to convey signaling information.) Advantageously, in-band signaling does not require an additional interface between the computer and speaker/microphone 135 other than the audio interface line-in and line-out signals. In fact, in-band signaling allows the use of stored audio wave files (".wav") as known in the art). As such, any application that has the capability of dealing with audio signals can perform the required mode switching without the use of specialized drivers. This method would be also be operating system and platform independent.

Once powered-up, three basic in-band signals are used to enter each one of the three modes of operation. Upon receipt of an audio signal containing one of the three in-band signals, operation speaker/microphone 135 changes to the respective mode of operation.

To prevent extraneous changes of states, but to allow reliable detection of these in-band signals in the presence of relatively large amounts of other signals (such as might be currently playing when the mode change is requested), some special considerations need to be given to the design of the signals and the decoder used to detect them. Illustratively, the use of DTMF digits A, B, C, and D, makeup the basic symbols of the messages used for in-band signaling. (DTMF signaling itself is well-known and will not be described in detail. Generally speaking, industry-defined DTMF digits, or symbols, are made up of a pair of frequencies known as a row frequency and a column frequency (also known as a low frequency and a high frequency) which make up a table of permissible frequency pairs for use in generating DTMF tones.)

As known in the art, in normal DTMF signaling by a telephone the microphone is usually muted. This results in a pure set of tones with relatively little energy outside of the expected DTMF low and high tones. Most DTMF decoders measure both the low and high tone energies, as well as the energy at other frequencies to determine if the signal is "pure" enough. This is to prevent talk-off, a condition where speech is mistaken for a DTMF digit.

In contrast, speaker/microphone 135 receives the in-band signaling information through the line-in port. As such, reception of DTMF signals may occur in the presence of other signals (e.g., if a song from a CD-ROM is currently being played) and another method of reliable DTMF detection must be used to ensure against the occurrence of talk-off. This new method of reliable DTMF detection is described next.

To prevent talk-off using in-band signaling, a strict sequence of four DTMF digits is used. The first three DTMF digits, with a strict timing relationship, are used as a pre-amble, or header, to activate the reception of the fourth DTMF digit. This fourth digit then determines the appropriate mode of operation. Although there may be several "false detections" of DTMF digits, or even the intentional use of DTMF digits by applications for other purposes, lab testing suggests the occurrence of the exact sequence with the exact timing relationships is not likely.

Illustrative, the DTMF pre-amble, or header, is the DTMF sequence "CAD" at 100 milli-second (ms) intervals, with no intervening silence. The fourth DTMF digit is either A, B, or C. This last DTMF digit determines the appropriate state. The entire sequence takes exactly 400 ms (four DTMF digits multiplied by 100 ms per digit). (It should be noted that more than one type of header could be used, with, e.g., different headers indicating different types of operations like testing etc.) A summary of the modes and the associated DTMF sequences is shown in Table Two, below.

TABLE Two

| DTMF Sequence | Mode of Operation |
| --- | --- |
| CADA | narrow-band telecommunications |
| CADB | multi-media |
| CADC | wide-band telecommunications |

Figure 5:
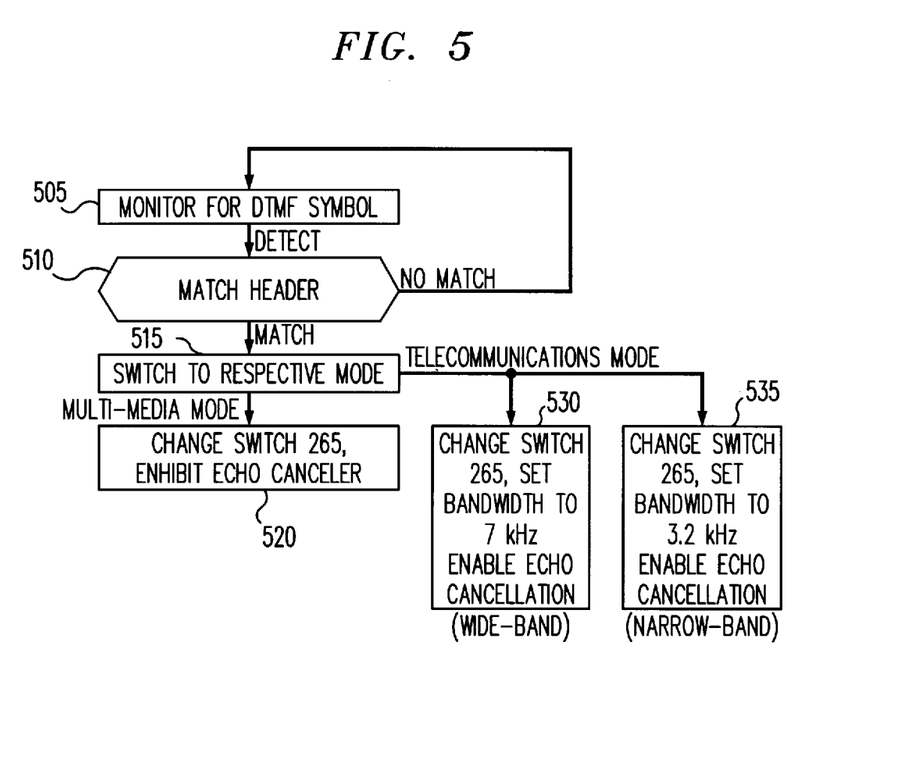
FIG. 5 shows an illustrative method for use in detecting an in-band DTMF-based signal.

A method for use in a DTMF detection system is shown in FIG. 5. This method is implemented using DSP 250 and codec/amplifier 230. In step 505, DSP 250 monitors the input signal for a DTMF symbol. Upon detection, DSP 250 goes to step 510 to compare the previous three DTMF symbols (received in the previous 300 ms) against the predefined header. If there is no match, DSP 250 returns to step 505 to monitor for the next DTMF digit. On the other hand, if there is a match, DSP 250 switches to the respective mode in step 515 using the currently received DTMF symbol. The respective modes are indicated in Table Two (above). As described previously, each mode causes DSP 250 to alter the signal processing of the audio and microphone signals. For example, multi-media mode causes DSP 250 to control switch 265 to provide audio from the multi-media portion of speaker/microphone 135. This switches out, or disables, the echo canceler function provided by DSP 250 and thereby removes echo cancellation of the audio signal provided to the speakers. In addition, in this mode the microphone signal is take from microphone system 255 of FIG. 3 (or, alternatively, FIG. 4).

Figure 6:
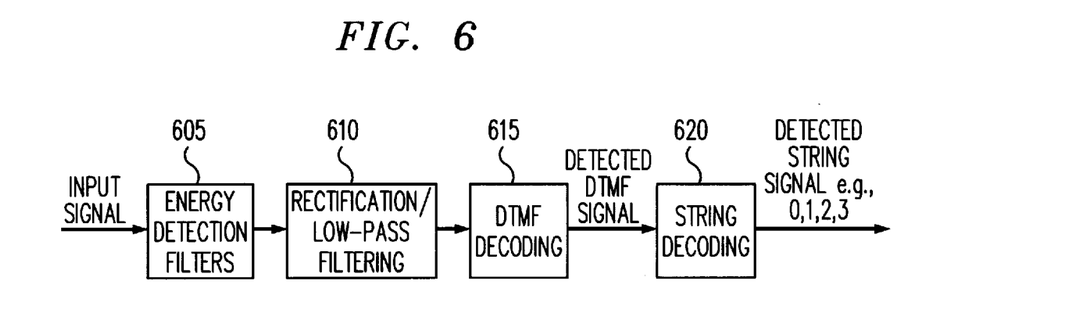
FIG. 6 shows an illustrative software architecture use in implement steps 505 and 510 of FIG. 5.

As noted, the DTMF detection is provided by DSP 250 and codec/amplifier 230. Software coding of this DTMF detection system can be illustratively divided into four basic blocks as shown in FIG. 6. These four blocks correspond to steps 505 and 510 of FIG. 5. DSP 250 implements an in-band receiver as a subroutine that is called once every 125 microseconds in either an 8K sample mode of operation or a 16K sample mode of operation. The subroutine returns the value 0 each sample period if nothing is detected. A value of 1 through 3 is returned when the sequences CADA–CADC have been detected, respectively. The same value will be returned for each subroutine call for a period of at least 25 ms and possible up to approximately 100 ms at the end of each detected signal. This value can be used by the DSP code to make the appropriate changes in state.

The first block, 605, is the energy detection filters. These consist of a bank of five sixth order elliptic IIR filters (infinite impulse response filters) at the four column frequency and the fourth row frequencies of a DTMF table. This stage also provides some loss to help prevent saturation. Specification are for a 20 Hz bandwidth centered at each DTMF frequency, with at least 40 dB of rejection at 100 Hz away from each center frequency. The next block, 610, provides rectification and low pass filtering, along with further loss. This provides a signal corresponding to the envelopes out of the five filters.

The decoder block, 615, is the third block. This block compares the outputs of the low pass filters to a threshold. This threshold has both fixed and variable components to allow for a wide dynamic range of input signals. The variable component is the sum of the lowest three values of the low pass filters. To this is added a fixed component to set a minimum threshold level allowable. It also makes sure that both the row and column signals corresponding to A–D are valid. This block is implemented as a separate subroutine and is executed only on 25 ms intervals.

The final block, 620, does string decoding. It looks at the last 300 ms of outputs of the decoder block and determines if the proper sequence of signals with the proper timing relationship has been seen, i.e., the header. If this is true, then the appropriate number, 1 through 3 is returned depending on the current string being decoded.

The in-band signals initially have an amplitude of −16 dB relative to the peak signal level of the analog/digital (A/D) and digital/analog converters (not shown). The symbols should be continuous, with no instantaneous phase changes when going from one symbol to another in either the high frequency or the low frequency.

Figure 7:
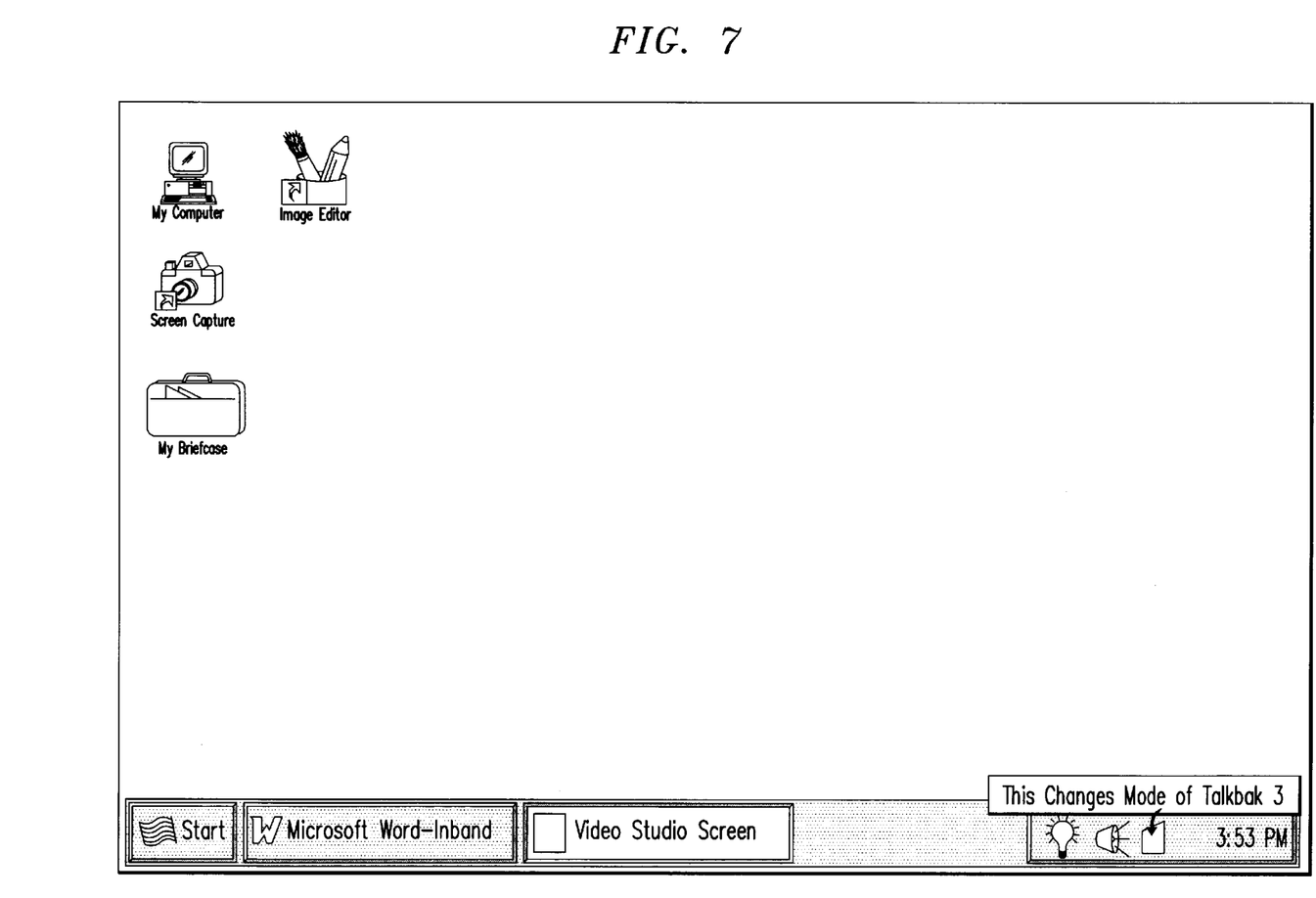
FIGS. 7 and 8 show examples of using an "applet" to change operating modes.
Figure 8:
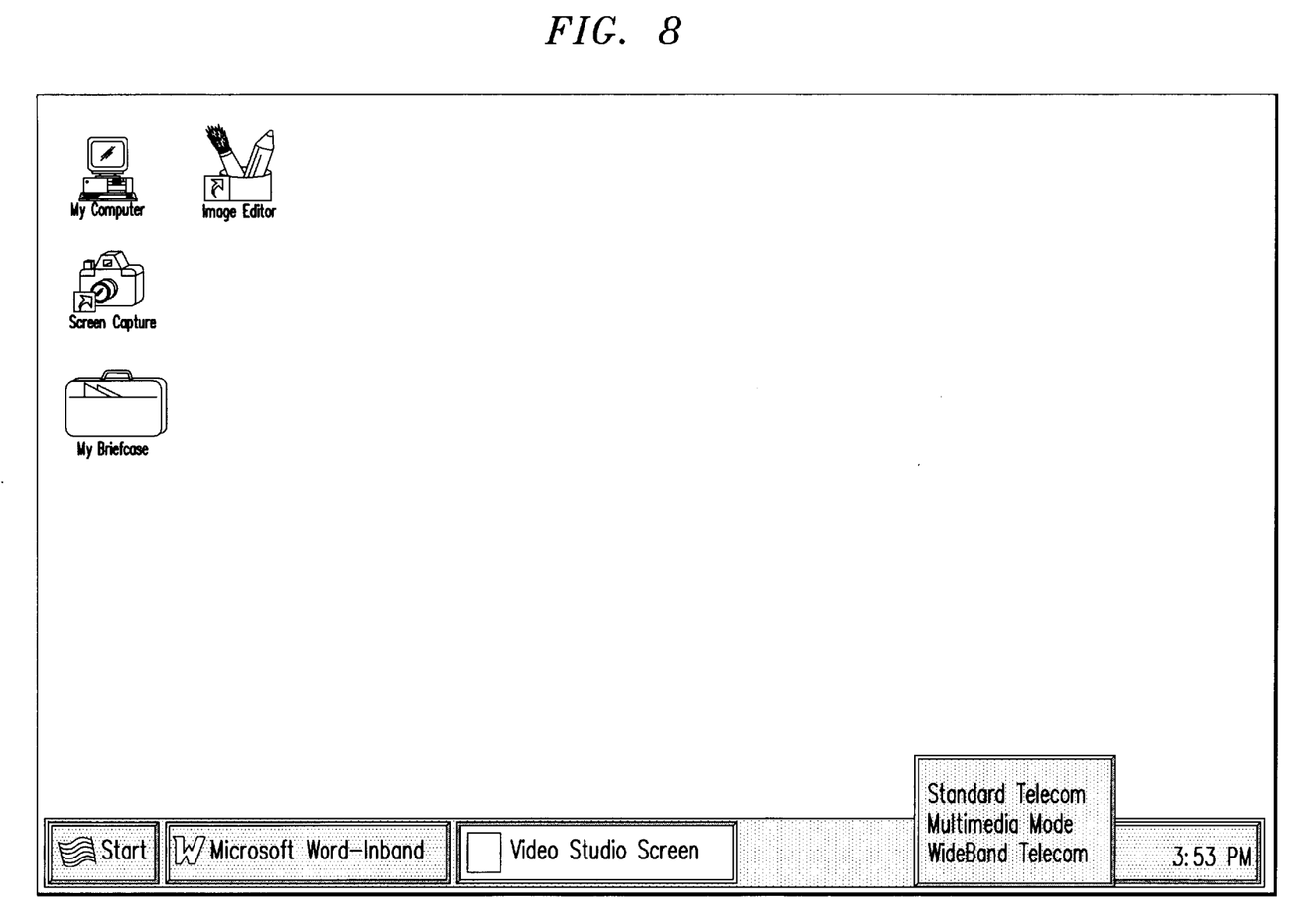

As noted above, changing modes can be effected by simply playing a "wave file," that generates the appropriate DTMF sequence. This wave file can played in any number of ways by the user. For example, a small program, or "applet," can be used to switch modes. Assuming a Windows 95 operating system (with an associated mouse as a pointing device), an icon representing this applet is present on the task bar. Selection of this icon by right-clicking with the mouse causes a pop-up menu to appear. This pop-up menu allows the user to select the desired mode. A selected menu item causes the appropriate in-band signal to be played. Illustrative views of such a desktop control are shown in FIGS. 7 and 8.

Alternatively, the application itself can cause the appropriate in-band signal to be generated. For example, an application program can play the appropriate wave file at start-up and restore the computer back to the previous state upon exit. For example, upon execution of an application that enables video conferencing, the video conferencing application can first play a wave file to switch speaker/microphone system 135 to a telecommunications mode of operation. When finished, and just before exiting, this same application can play a wave file to restore the computer to a multi-media mode of operation—all performed without user intervention.

It should be noted that in accordance with a feature of the invention, the use of two speakers in a video conferencing arrangement splits the mono signal. (Assuming of course, the speakers are properly physically arranged.) The net effect from a human factors point of view is a centering of the acoustic image. It is further proposed that the well-known "Haas effect" (also known as the "precedence effect") be utilized by DSP 250 to reduce power to main speaker 134, yet retain a centered acoustic image. In particular, microphone 139 is closer to main speaker 134 since both are incorporated within the same enclosure. As a result, the echo canceler has to, so-to-speak, work harder to remove echoes. However, by bleeding energy to satellite speaker 133 and then using the Haas effect—echo cancellation is improved and the acoustic image is still centered. (As defined in the "Audio Dictionary" by Glenn D. White, University of Washington Press, 1987, the Haas effect, also called the precedence effect, is related to the localization of the apparent sonic image when the same signal is presented to the two ears at slightly different times.) In other words, providing more energy to the satellite speaker moves the acoustic image off-center to the satellite speaker. However, adding an experimentally determined time delay to the satellite speaker path moves the acoustic image back toward center.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, other applications of the inventive concept are possible such as hands-free telephony that delivers high-quality digital multi-media content over twisted pair or LAN wiring. Also, the inventive concept is equally applicable to a sound system with different operating modes. Indeed, the inventive concept can be applied to changing the mode or state of the computer system or, equivalently, another component of the computer system. As used herein, "changing the mode of the computer system" means changing the mode of the, e.g., motherboard, or another component of the computer system, e.g., another type of interface board.

Also, although the above embodiment was illustrated in the context of in-band signaling in the context of an audio signal, other forms of signaling could be used such as coupling the speaker system through the keyboard connector, where a particular set of keyboard commands would be used to indicate the above-described mode changes. Alternatively, mode information could be directly sent to a speaker system via the "universal serial bus" (USB) currently being proposed in the industry for coupling peripherals to a computer. In addition, the above-mentioned echo canceler subsystem used in full-duplex voice communications could be located on a sound board of the PC, wherein it could be enabled or disabled in accordance with the principles of this inventions.

What is claimed:

1. A sound system comprising:

an echo canceler;

a headphone detector; and a processor responsive to a signal from the headphone detector for resetting the echo canceler when headphones are detected or removed.

2. The apparatus of claim 1 wherein the resetting initiates a retrain of the echo canceler coefficients.

3. A sound system comprising:

a headphone detector; and a processor a) used to perform an echo canceler function, and b) responsive to a signal from the headphone detector for retraining the echo canceler function when headphones are inserted or removed.

4. The apparatus of claim 3 wherein the processor retrains the echo canceler when headphones are inserted or removed.

5. The apparatus of claim 4 wherein the sound system is a part of a work station.

6. A computer system comprising:

a speaker arrangement; and a sound system for driving the speaker arrangement to play acoustical signals;

wherein the sound system further comprises a headphone detector and a processor responsive to the headphone detector for controlling an echo canceler of the sound system as a function of the presence of headphones.

7. The apparatus of claim 6 wherein the processor retrains the echo canceler when the headphone detector indicates that headphones are inserted or removed.

8. The apparatus of claim 6 wherein the processor resets coefficients used in the echo canceler when the headphone detector indicates that headphones are inserted or removed.

9. A method for use in controlling the operation of an echo canceler, the method comprising the steps of:

detecting the presence of headphones; and responsive to the detecting step, retraining the echo canceler as the function of the detection of the headphones.

10. The method of claim 9 wherein the responsive step includes the step of resetting coefficient of the echo canceler.

11. The method of claim 9 further comprising the step of switching to a telecommunications mode of operation as a pre-condition to enabling or disabling the echo canceler as a function of the presence of the headphones.

* * * * *